June 29, 1965   F. W. KEITH, JR   3,192,149
SEPARATION OF COMPONENTS OF LIQUID-SOLIDS MIXTURES
Filed Oct. 19, 1961   3 Sheets-Sheet 1

INVENTOR.
FREDERICK W. KEITH, JR.
BY Dallett Hoopes
ATTORNEY

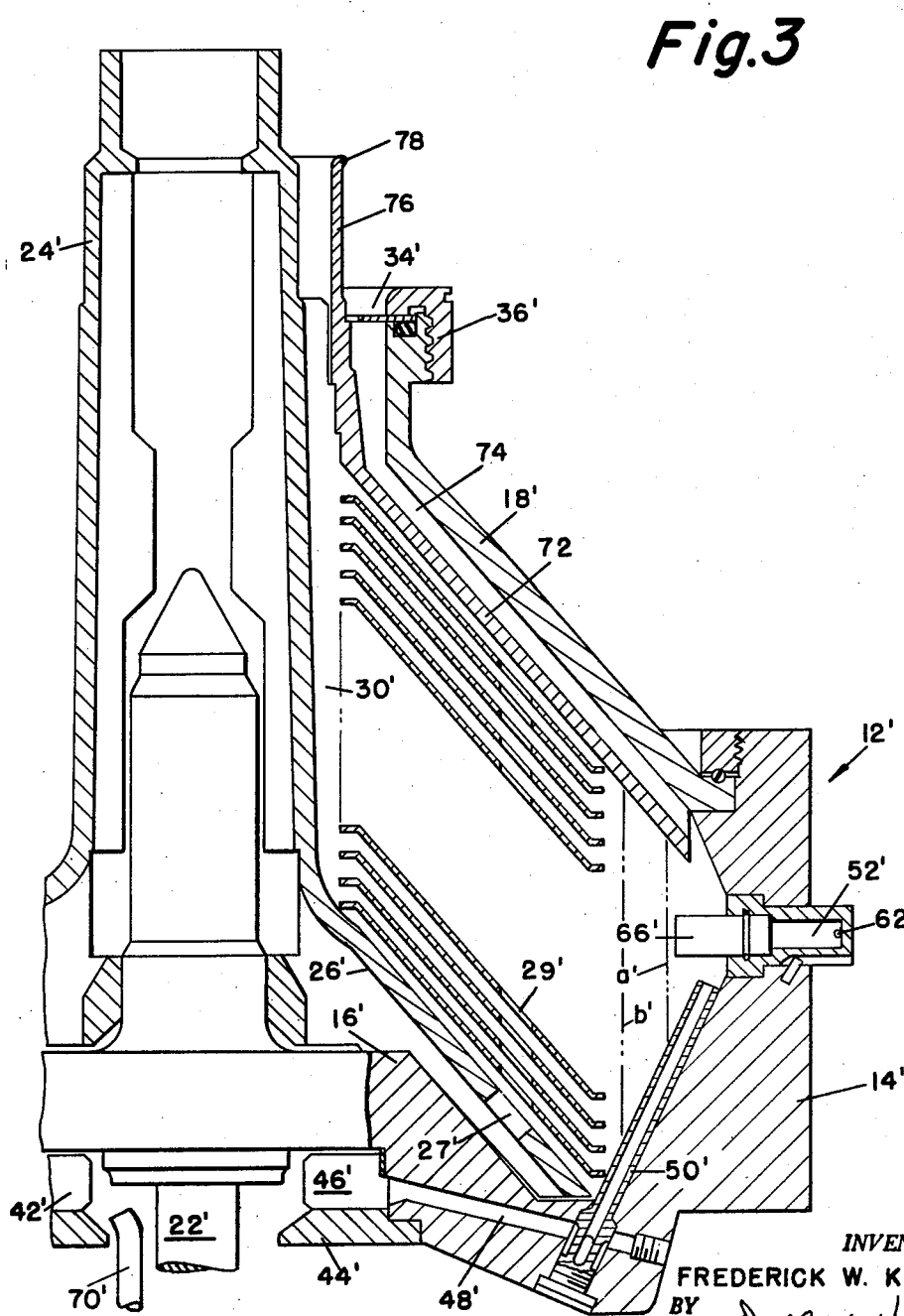

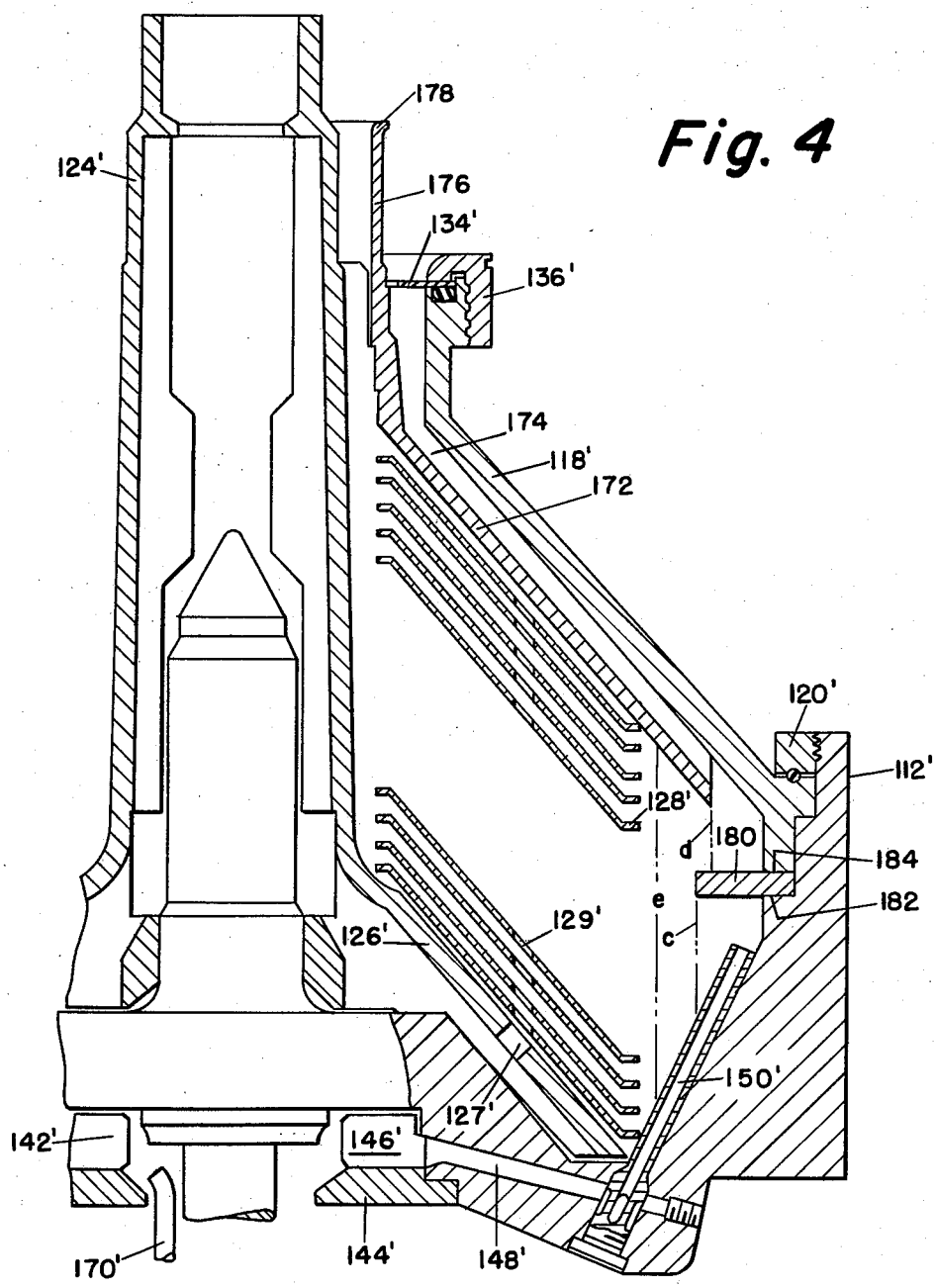

United States Patent Office 3,192,149
Patented June 29, 1965

3,192,149
SEPARATION OF COMPONENTS OF LIQUID-SOLIDS MIXTURES
Frederick W. Keith, Jr., Gladwyne, Pa., assignor to Pennsalt Chemicals Corporation, a corporation of Pennsylvania
Filed Oct. 19, 1961, Ser. No. 146,268
11 Claims. (Cl. 208—28)

This invention relates to the separation of components of a liquid-solids mixture. More specifically, this invention can be used in the centrifugal separation of hydrocarbon wax from hydrocarbon oil and provides for an improved degree of liberation of oil from the wax solids of the concentrate with consequent enrichment of the oil. It also is concerned with improved discharge of wax solids from the centrifugal bowl.

In the prior art there has been noted in the dewaxing by centrifugation of petroleum distillate stocks the tendency of the wax solids to adhere to and to occlude quantities of oil. This tendency results in a wax discharge with high oil content and the loss of oil. Under the present invention the wax is to a large degree separated from the oil it would otherwise occlude and the wax emerges from the process with unusual freedom from the oil. The oil, consequently, discharges in higher yield.

Another drawback of many prior art attempts at the centrifugal separation of hydrocarbon wax from oil, especially the separation of crystalline wax from oil, has been the adherence of wax solids to the walls of the centrifuge rotor, and the consequent eventual plugging of the flow channels of the rotor. The present invention overcomes this difficulty.

The present invention presents a process and apparatus applicable to the separation of hydrocarbon wax from oil. It is especially useful in the removal of wax solids and will be described in connection therewith. The solids may be of crystalline nature. It should be understood, however, that the invention is capable of other applications, and is useful in the removal of amorphous wax particles from oil and generally in any centrifugal processing wherein a flowable layer is formed including solids which enclose or otherwise retain a liquid which it is desired to remove from the solids as much as possible. It is also useful in a situation in which solids would have a tendency to cling to and build up on the wall of the rotor.

This invention embodies other novel features, details of construction and arrangement of parts which are hereinafter set forth in the specification and claims, and illustrated in the accompanying drawings, wherein:

FIGURE 3 is a fragmentary sectional view of a centrifuge rotor embodying another form of the invention; and FIGURE 4 is a fragmentary sectional view of a centrifuge rotor embodying still another form of the invention.

Briefly, when used in the dewaxing of petroleum distillate stock, the invention involves introducing the stock in solvent with wax solidified and a second liquid heavier than the solution to a zone of centrifugation whereby the heavier liquid displaces inwardly the oil in solvent and the solids, the solids concentrating in the oil immediately inward of the heavier liquid; causing a rapid shallow localized flow of the heavier liquid immediately radially outward of the concentrate and an outward spilling of the heavier liquid adjacent the flow to agitate the adjacent solids in the concentrate causing them to release a portion of their retained oil, and permitting discharge separately of the oil and the heavier liquid, the latter including entrained wax solids from the concentrate.

Figure 1:
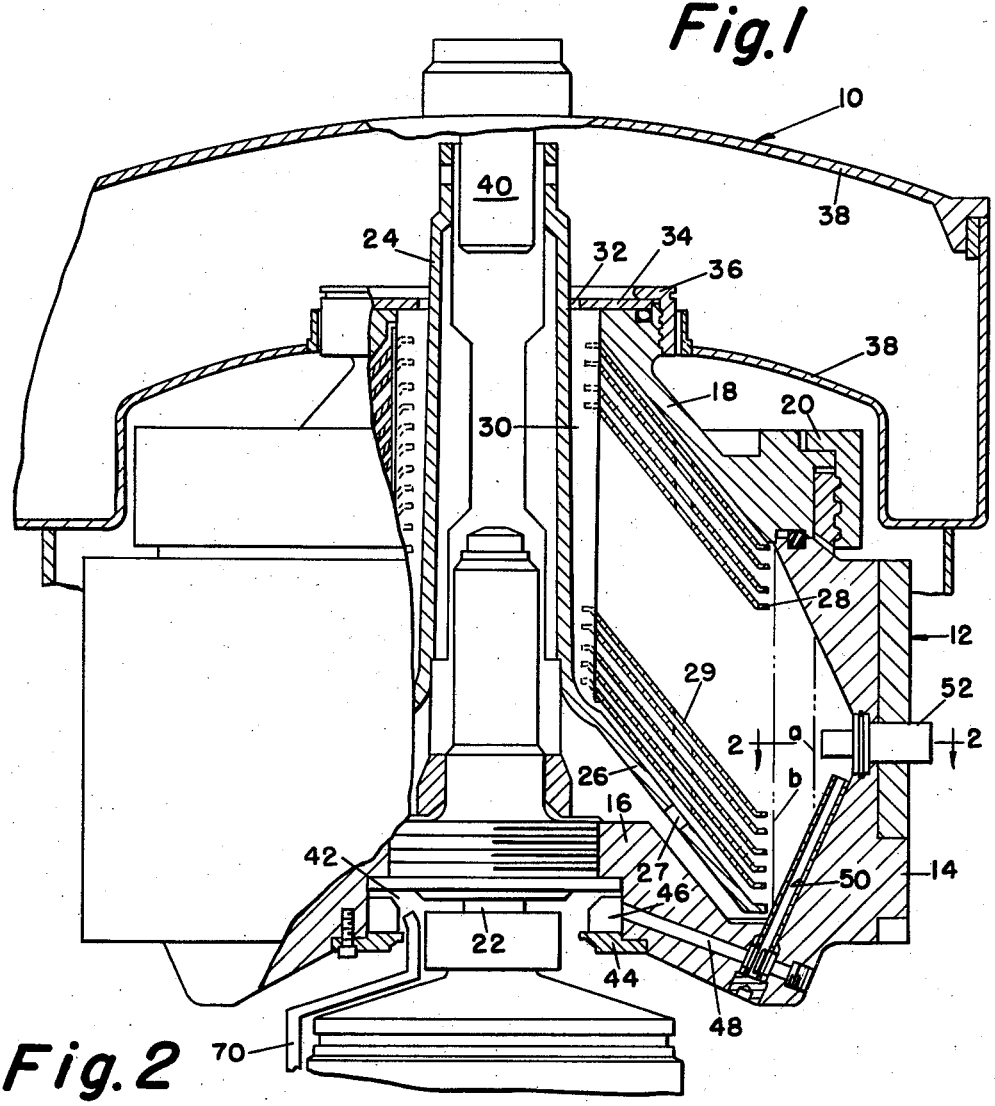
FIGURE 1 is an elevational view partly in section of a centrifuge rotor embodying one form of the invention.

In the embodiment of the invention of FIGURE 1, the centrifuge rotor illustrated is of the disc type, and is provided with a number of peripheral nozzles which permit continuous discharge therethrough. The apparatus is broadly designated 10. It comprises a rotor 12 including a shell 14 having a central hub 16 and a top 18. The top is held down against the shell by a threaded retaining element 20. The rotor is mounted on the power spindle 22, and receives center tube 24 which has its lower end disposed about the hub 16 but spaced therefrom. The lower end of the center tube flares outward into a feed distribution skirt 26 spaced from the hub and shell of the rotor. Feed openings 27 are disposed in the skirt spaced inward from the outer edge. Surrounding the center tube 24 is a nested stack 28 of spaced frusto-conical discs which extend upward to top 18 and have feed openings 29 in vertical alignment with the openings 27. Between the inner periphery of the stack 28 and the center tube 24 is an annular passage 30, and in alignment therewith is an opening 32 in top 18. A ring dam 34 is secured over opening 32 by the threaded retaining element 36. A cover 38 is provided over and about the element 36. Feed tube 40 extends into the center tube 24.

At the lower end of the rotor about the spindle 22 is an annular inwardly facing pocket 42 partially defined by a ring element 44 secured against the shell. Radially disposed accelerating vanes 46 are provided in the pocket 42. From the pocket 42 extends outward in the shell 14 the passage 48 which communicates with an upwardly directed tube 50 terminating upwardly in an opening adjacent the center of the rotor wall. A number of such passages and tubes may be circumferentially spaced about the axis of the rotor.

Figure 2:
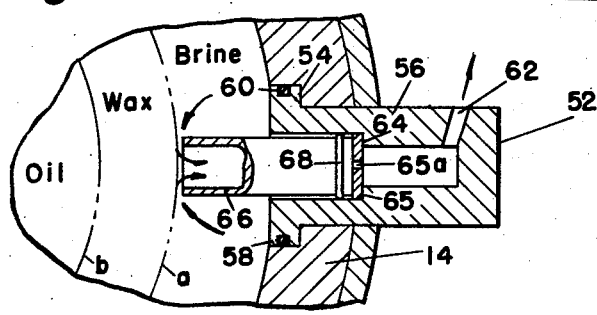
FIGURE 2 is an enlarged fragmentary sectional view taken on the line 2—2 of FIGURE 1.

A plurality of nozzle holders 52 are spaced circumferentially about the wall of shell 14 and are each set in openings formed in the wall and having a stepped structure, larger in diameter at the inside of the wall than at the outer to present a shoulder 54 (FIGURE 2). Each nozzle holder 52 is a cup-shaped element 56 having an outward flange 58 about the open end thereof. The flange 58 rests against the shoulder 54 and is grooved about its periphery to receive a sealing ring 60. The nozzle opening 62 is formed in the wall of the holder and faces rearward of the direction of rotation of the bowl. As shown in FIGURE 2 the holder 52 has its central cavity of stepped construction to present a shoulder 64. Controlling the discharge an orifice plate 65 having a central opening 65a of selected size may rest on shoulder 64. Received into the larger portion of cavity and abutting against the orifice plate 65 is a tube extension 66 which extends inward toward the disc stack 28. The tube extension 66 carries an annular groove which receives a sealing ring 68 to seal the juncture of extension 66 and the nozzle holder 52.

A liquid supply line 70 is provided adjacent the base of the spindle 22 and terminates upwardly in an opening adjacent the annular inward pocket 42.

In the operation of the apparatus disclosed in FIGURES 1 and 2 the feed liquid may comprise for example a mixture of wax and oil in a solvent (such as methyl ethyl ketone). The mixture may be previously heated to permit complete solution of all wax and then chilled as is conventional to solidify the wax. This mixture is introduced through the feed tube 40 into the center tube 24, outward under skirt 28, through openings 27 and into the primary separating zone of the bowl. Brine, water, or other liquid immiscible with oil and wax and of greater density than wax is introduced by the liquid supply line 70 in excess into the pocket 42 and thereby through passage 48 and tube 50 into the rotor. The demand for the liquid flow from the pocket 42 into the bowl naturally results from the tendency of the various liquids to maintain hydrostatic balance between portions within the rotor and portions without the rotor in passage 48 and tube 50 as liquid discharges through extension 66. In this connection it should be noted that because the liquid of greater density is present in passage 48 and tube 50, the controlling edge of dam 44 may be inward of dam 34 and oil will still discharge over dam 34.

In the centrifugal field the various layers will form as indicated illustratively by the interface lines in FIGURE 1. The wax solids will concentrate and compact outward of the disc stack. Line "a" indicates the wax-brine interface while line "b" indicates the wax-oil interface which may not be sharply defined. The position of the interfaces with respect to the elements is important. Interface "a" will locate immediately inward of the inner end of the tube extension 66. The interface "b" should preferably be positioned outside the disc stack 28.

Continued introduction of feed through pipe 40 and liquid through line 70 results in the upward flow of separated oil through passage 30 and over the ring dam 34 into cover 38, and discharge of brine with entrained wax solids through the nozzle openings 62. It is important that the entrainment of wax in the discharging brine and the inner diameter of ring dam 34 be sufficient to avoid the accumulation of wax inwardly of the rotor into the disc stack 28. Such accumulation could result in the passage of wax out of the bowl with the oil discharge, defeating the primary objective of the separation. It could also result in partial or complete plugging of the disc stack 28.

The entrainment of the wax in the brine is neatly effected by the device of FIGURES 1 and 2. It has been noted that discharge through extension 66 causes wax concentrate-brine interface "a" to locate immediately inside extension 66. The brine in discharging through extension 66 will cause a shallow localized flow of brine inward of the annular end or mouth of extension 66 and in a direction substantially tangential to the interface "a" (FIGURE 2). This rapid shallow localized flow of brine will create a zone of lower pressure establishing a venturi effect and promoting entrainment of wax solids from the adjacent wax layer into the discharging brine. The movement of brine into the extension 66 eliminates the danger of the wax concentrate growing inwardly, stagnating or growing outwardly beyond the inward end of extension 66 and it eliminates all possibility of wax adhering to the wall of the rotor adjacent the nozzle holder 52.

The arrangement disclosed in FIGURES 1 and 2 provides simple means by which wax solids, especially solids of crystalline nature, may be entrained in a carrier liquid and easily discharged from a centrifuge through peripheral nozzles without danger of contacting and sticking to the wall of the rotor. Another benefit accrues. The rapid shallow localized flow of brine about the end of the extension 66 and the spilling outward of the brine into the extension 66 causes agitation of the wax solids. The agitation or turbulence is probably greatest just inside the mouth of extension 66 and disturbs the concentrate of wax solids. Individual solids so disturbed release enclosed or retained portions of oil for separate flow outward through the nozzle as droplets separated from the wax. The wax and oil so separated may be easily separately recovered after discharge by gravity settling procedures, for instance.

In addition, the rapid shallow localized flow of brine in a direction substantially tangential of the wax-brine interface causes a condition of high shear or turbulence in the wax layer thereadjacent, liberating some of the oil enclosed in wax solids for diffusion through the wax layer and discharge with the oil out through passage 30 and over the ring dam 34.

Thus at least two purposes are served by the arrangement of FIGURES 1 and 2: effective discharge of the wax from the bowl, and a washing of the wax.

Modified form

As shown in FIGURE 3 the structure of the rotor may be altered to include a dividing cone 72 disposed on the upper disc element of the disc stack 28' and spaced downward from the top 18' by a plurality of radial spacers to permit a passage 74 of liquid upward to the ring dam 34'. The upper end of the dividing cone 72 carries a longitudinal upward extension 76 spaced outwardly from center tube 24' and terminating in a discharge weir 78. As shown, the dividing cone 72 extends outward beyond the margin of the disc stack to a radius beyond the inner end of the extension 66'.

In other respects, the structure of the centrifuge bowl of FIGURE 3 is similar to that of FIGURE 1, and the primed form of the same reference numeral is used to designate corresponding parts.

In the operation of the modified form of the invention shown in FIGURE 3, feed mixture as described in connection with FIGURE 1 is fed through center tube 24', and passages 27', and brine or the like carrier liquid is fed from line 70 into the annular pocket 42'. After a period of operation the interface "a'" is established by discharge of wax through extension 66'. Interface "b'" which may not be sharply defined is established by ring dam 34' at a position outside the disc stack 28', and the wax concentrate compacts between the interfaces "a'" and "b'." The oil discharges over weir 78 and brine, entraining wax solids discharges with benefits comparable to those of the FIGURE 1 embodiment through extension 66' and opening 62'. Excess brine passes out over ring dam 34'. Appropriate collectors for effluent over weir 78 and dam 34' respectively are provided (not shown).

In another embodiment a rotor may be used comparable to that of FIGURE 3 with pocket 42', passage 48' and tube 50' eliminated. In the operation of this modified form of the invention not only the feed mixture but also the brine or other carrier liquid is fed through the feed tube 24', under the skirt 26' through openings 27' and into the primary separating zone of the rotor. In the dewaxing process, the interfaces "a'" and "b'" establish, as with the FIGURE 3 embodiment, after a period of operation, and, the brine with entrained wax solids and liberated oil discharges through the extension 66'. Excess brine passes above the dividing cone 72 through passage 74 and over the ring dam 34'. The oil moves inwardly of the rotor and discharges by way of extension 76 over weir 78. Appropriate receiving means for the various effluents are provided.

In a further variation, brine or the like may be introduced to the rotor through the opening in the ring dam 34' as disclosed for instance in the Jones Patent 2,407,834 issued September 17, 1946. In this variation the tube 50', passage 48', etc. are eliminated. The oil in solvent and wax, for example, may be introduced through center tube 24'. Operation is as with the FIGURE 3 embodiment.

Additional modified form

An additional modified form of the invention is disclosed in FIGURE 4. Except for a few seemingly minor, though extremely significant structural changes, the organization is similar to that disclosed in FIGURE 3. For simplicity in the FIGURE 4 embodiment elements corresponding to elements of the FIGURE 3 embodiment are designated by the same reference numeral augmented by 100.

In the FIGURE 4 embodiment the dividing cone 172 extends outwardly beyond the limit of the disc stack. No peripheral nozzle is provided. Instead, above the tube 150' an annular dam 180 is secured about the wall of the shell 114' and extends inwardly toward the disc stack 128'. Conveniently, the dam comprises a ring which is clamped between radial seats 182 and 184 on the rotor shell 114' and the top 118', respectively. In this embodiment the threaded ring 120' is externally threaded and engages threads on the inside of the upper portion of the shell as shown. The dividing cone 172 extends outward beyond the inner edge of the annular dam 180.

It should be understood that the dam 180 while shown in the drawings as an integral part of the rotor it may be a separate piece secured to the rotor by any suitable means. Appropriate seals may be provided between the parts of the rotor and the dam 180 if desired.

In the operation of the FIGURE 4 embodiment feed is supplied through the center tube 124' and outward under the skirt 126' through openings 127' and into the primary separating zone of the rotor. Brine or other immiscible carrier liquid is supplied through the line 170' through the passage 148' and the tube 150'. After a period of rotation, an annular brine layer is formed below the dam 180 and partly defined by the interface "c." Additional brine flowing through the tube 150' causes the layer to overflow upward over dam 180 and accumulate in an annular layer thereabove, partly defined by the wax-brine interface "d" extending between the dam 180 and a point slightly outward of the outer edge of the dividing cone 172. The wax-oil interface will preferably form outside of the disc stack 128' at "e," and will be established in position partly by the size of the ring dam 134'.

By means of the dam 180 and the flow thereover of brine supplied through the tube 150, a rapid shallow localized flow is created immediately radially inward of the dam 180 and thus partly inward of the wax interface "d."

In addition to the rapid shallow localized flow in a direction substantially tangential to the brine-wax interface "c," the spilling of brine outward of the bowl over the dam 180 and through the wax concentrate causes additional entrainment of wax solids and agitation of the wax solids resulting in the liberation of portions of oil retained therein. The turbulence of the flow is enhanced by the absence of any means to tangentially accelerate the outward spilling liquid. The liberated oil subsequently flows with the brine including entrained wax around the edge of cone 172, through the passage 174, and over weir 134'. Clarified oil passes out the tube 176 and over the discharge weir 178. The discharged liquids are received in suitable receptacles as will be understood by one skilled in the art.

As with the earlier discussed embodiments, wax in the wax layer is made turbulent immediately inward of the rapid shallow localized flow inward of the dam 180. This causes liberation of some oil for diffusion through the wax layer upward through the tube 76 and over weir 78 with the oil discharge.

As is well known in the art, the solvent entering with the mixture discharges from the rotor with the oil and can be subsequently separated therefrom by distillation. Oil discharged with the wax can have its solvent stripped off in similar fashion.

*Example*

The following example meant not by way of limitation but as an illustration is representative of operation of the apparatus disclosed in FIGURE 1.

A rotor as disclosed in FIGURE 1 having fifty spaced discs and four peripheral nozzles with extensions 66 extending inwardly 0.47" from the inside surface rotor wall was rotated at 10,000 r.p.m. A petroleum distillate fraction having a pour point of approximately 40° F., diluted with methylethylketone, was fed at the rate of 1 gallon per minute at 8° F. Its wax content was 6%. A supply of 1.3 to 2.5 gallons per minute of brine through line 70 caused a discharge of wax solids with the brine through nozzle extension 66. Wax at 46% to 55% oil after decanting the brine and stripping off the solvent was produced.

It should be noted that the practice of the invention is not limited to the use of oil in a solvent. Dewaxing may be accomplished on some light oils in the absence of solution in a solvent.

In all embodiments liberation of oil from the zones between the wax solids as well as the entrainment of the solids themselves by the brine flow will be facilitated by the addition of surface active agents, preferably of the ionic type, such as the commercial products known in the trade under the trademark Tergitol or the various organic-phosphorous compounds, such as sodium di-decyl phosphate as discussed in the U.S. Patent 2,793,169, which issued May 21, 1957. Such agents enable the carrier liquid to preferentially wet the wax solids, and replace the oil on the surfaces thereof.

It is contemplated that aside from the separation of wax solids from oil, the process and apparatus disclosed herein may be effectively used in the production of tall oil to assist in removal of interfacial solids such as lignin between the tall oil layer and the mineral acid layer. The invention has application in the separation of sterols and other high molecular weight solids intermediate in density between fatty acid layer and aqueous mineral acid layer resulting from the acidulation of vegetable oil soapstocks.

The invention has other applications. In general, it is particularly well adapted to the removal from a liquid-solid mixture of solids having a tendency to occlude portions of a liquid phase therebetween. It results in the liberation of much of the liquid from the solids in the solids discharge. As noted, the invention also provides for removal from a zone of centrifugation of solids otherwise having a tendency to adhere to the walls of the zone.

It is therefore to be understood that the above particular description is by way of illustration and not of limitation, and that changes, omissions, additions, substitutions and/or other modifications may be made without departing from the spirit of the invention. Accordingly it is intended that the patent shall cover, by suitable expression in the claims, the various features of patentable novelty that reside in the invention.

I claim:

1. In the dewaxing of hydrocarbon oil, the process comprising the steps of introducing the oil in mixture with the wax solids and a second liquid heavier than the mixture and not miscible therewith to a zone of centrifugation whereby the heavier liquid forms a layer and displaces inwardly the oil and wax solids and the oil is displaced inwardly by a layer of the wax solids, causing a rapid shallow localized flow of the heavier liquid immediately radially outward of the layer of wax solids and in a direction substantially tangential to the layer of wax solids, causing an outward spilling of the heavier liquid within the zone immediately adjacent the localized flow to agitate the wax solids in the layer of wax solids adjacent the area of the spilling to cause the wax solids to release a portion of their retained oil, and permitting discharge separately of the oil and the heavier liquid, the latter including entrained wax solids.

2. A process as described in claim 1 wherein the heavier liquid spills outward in an annulus about the axis of the zone and is then led inwardly and longitudinally of the axis to its point of discharge.

3. A process as described in claim 1 wherein the heavier liquid spills from intermediate the radial limits of its layer outward to the outside of the zone.

4. A process as described in claim 1 wherein the heavier liquid includes a surface active agent enabling the heavier liquid to preferentially wet the wax solids surfaces with consequent release of oil.

5. A process as described in claim 1 wherein the heavier liquid is introduced peripherally of the zone separately from the mixture.

6. In the separation of liquid and solid components of a liquid-solids mixture in which the solids have a tendency to retain portions of the liquid, the process comprising the steps of introducing the mixture and a second liquid heavier than the liquid component and not miscible therewith to a zone of centrifugation, whereby the heavier liquid forms a layer and displaces the said components inwardly and the said liquid component forms a layer inward of a layer of a concentrate of the solids; causing a rapid shallow localized flow of the heavier liquid immediately radially outward of the layer of concentrate and in a direction substantially tangential to the layer of concentrate, causing an outward spilling of the heavier liquid within the zone immediately adjacent the localized flow to agitate the solids in the layer of concentrate adjacent the area of the spilling to cause the solids to release a portion of their retained liquid, and permitting discharge separately of the liquid component and the heavier liquid, the latter including entrained solids from the layer of concentrate.

7. A process as described in claim 6 wherein the heavier liquid spills outward in an annulus about the axis of the zone and is then led inwardly and longitudinally of the axis to its point of discharge.

8. A process as described in claim 6 wherein the heavier liquid spills from intermediate the radial limits of its layer outward to the outside of the zone.

9. In the separation of liquid and solid components of a liquid-solids mixture in which the solids have a tendency to retain portions of the liquid, the process comprising the steps of introducing the mixture to a zone of centrifugation; introducing a second liquid heavier than the said liquid component and not miscible therewith to the periphery of the zone whereby the heavier liquid layer displaces inwardly the said components, and the liquid component forms a layer displaced inwardly by a layer of concentrate of the solid component; causing a rapid shallow localized flow of the heavier liquid immedaitely radially outward of the layer of concentrate and in a direction substantially tangential to the layer of concentrate; causing an outward spilling of the heavier liquid within the zone immediately adjacent the localized flow to agitate the solids in the layer of concentrate adjacent the area of the spilling to cause the solids to release a portion of their retained liquid; and permitting discharge separately of the liquid component and the heavier liquid, the latter including entrained solids from the layer of concentrate.

10. A process as described in claim 9 wherein the heavier liquid spills outward in an annulus about the axis of the zone and is then led inwardly and longitudinally of the axis to its point of discharge.

11. A process as described in claim 9 wherein the heavier liquid spills from intermediate the radial limits of its layer outward to the outside of the zone.

References Cited by the Examiner
UNITED STATES PATENTS

| | | | |
|---|---|---|---|
| Re. 17,719 | 7/30 | Jones | 208—267 |
| 1,649,117 | 11/27 | Jones | 233—14 |
| 2,266,554 | 12/41 | Jones | 208—28 |
| 2,407,834 | 9/46 | Jones | 208—28 |
| 2,695,748 | 11/54 | Millard | 233—47 |
| 2,719,003 | 9/55 | Strezynski | 233—47 |
| 2,869,779 | 1/59 | Geissler | 233—14 |
| 3,047,214 | 7/62 | Downing | 233—28 |
| 3,075,696 | 1/63 | Fitzsimmons | 233—47 |
| 3,080,109 | 3/63 | Halbach | 233—47 |

ALPHONSO D. SULLIVAN, *Primary Examiner.*

JOSEPH R. LIBERMAN, *Examiner.*